United States Patent
Haupin et al.

[11] 3,975,212
[45] Aug. 17, 1976

[54] THERMOCOUPLE PROTECTIVE COMPOSITE TUBE

[75] Inventors: Warren E. Haupin, Lower Burrell; John W. Luffy, New Kensington, both of Pa.

[73] Assignee: Aluminum Company of America, Pittsburgh, Pa.

[22] Filed: Jan. 10, 1975

[21] Appl. No.: 540,245

[52] U.S. Cl. .............. 136/232; 73/DIG. 9; 136/230; 136/234; 136/242
[51] Int. Cl.² ....................................... H01L 35/02
[58] Field of Search .......... 136/234, 232, 230, 242; 73/DIG. 9, 341

[56] References Cited
UNITED STATES PATENTS

| | | | |
|---|---|---|---|
| 2,858,351 | 10/1958 | Taylor | 136/234 |
| 2,915,575 | 12/1959 | Thomas | 136/223 |
| 3,049,577 | 8/1962 | Hill | 136/236 |
| 3,050,575 | 8/1962 | Sullivan | 136/202 |
| 3,106,493 | 10/1963 | Japka | 136/234 |
| 3,329,534 | 7/1967 | Adler et al. | 136/233 |
| 3,379,578 | 4/1968 | McTaggart et al. | 136/234 |
| 3,451,860 | 6/1969 | Schwartzwalder et al. | 136/230 |
| 3,463,674 | 8/1969 | Black et al. | 136/233 |
| 3,580,744 | 5/1971 | Inouye et al. | 136/242 |
| 3,610,045 | 10/1971 | Shearman | 136/234 |

FOREIGN PATENTS OR APPLICATIONS

| | | |
|---|---|---|
| 706,643 | 3/1954 | United Kingdom |

*Primary Examiner*—Maynard R. Wilbur
*Assistant Examiner*—Richard E. Berger
*Attorney, Agent, or Firm*—Andrew Alexander

[57] ABSTRACT

A thermocouple assembly having a thermocouple encased in a tube having an outer carbon permeable layer and an inner carbon reactive layer. The assembly provides extended life for thermocouples used in a carbonaceous environment such as in the carbon liner of a furnace or in carbon bodies during baking thereof.

11 Claims, 1 Drawing Figure

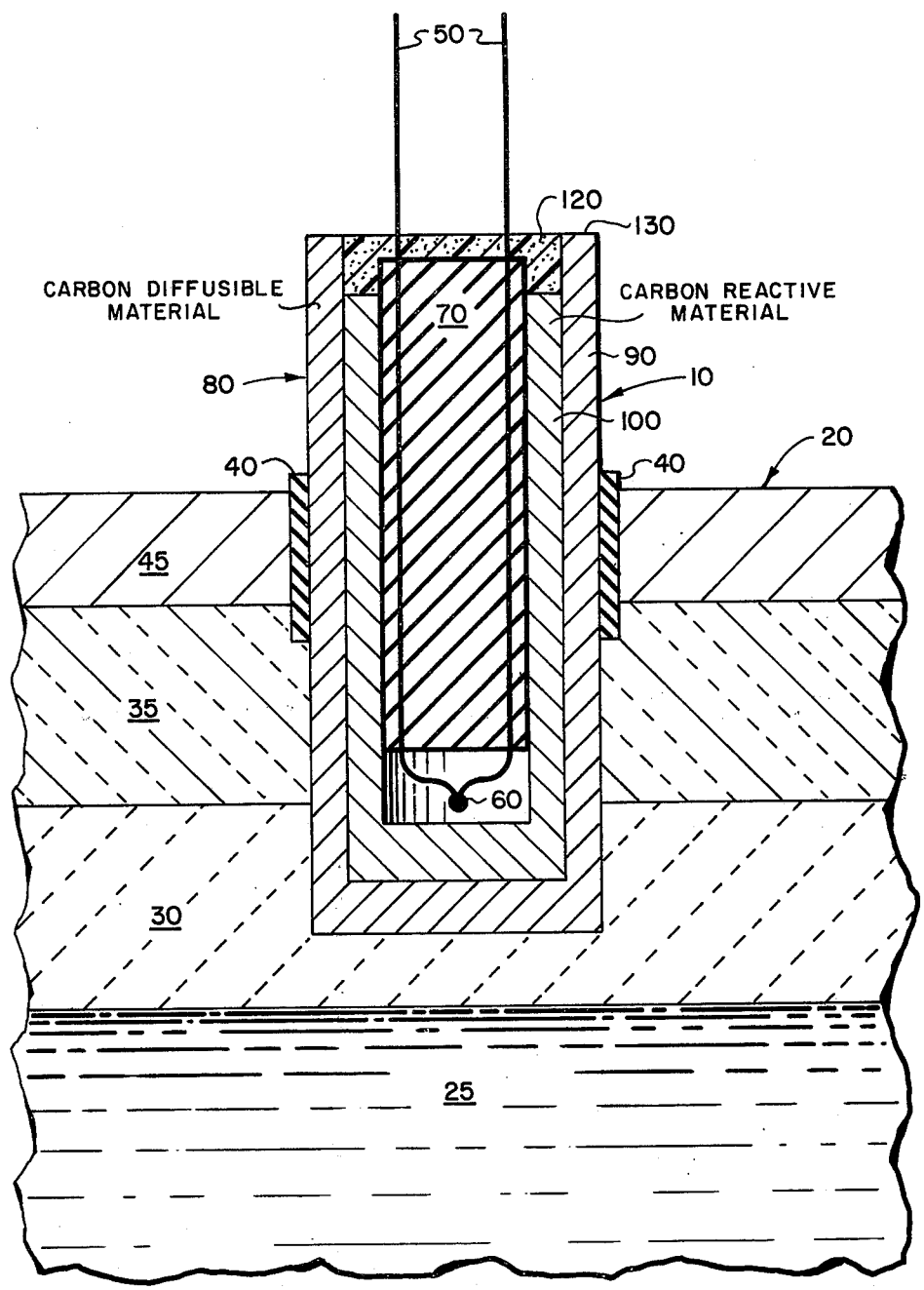

THERMOCOUPLE PROTECTIVE COMPOSITE TUBE

BACKGROUND OF THE INVENTION

This invention relates to thermocouples and in particular to protective coverings for thermocouples. A common practice to obtain temperature measurements of metal in its molten state is to immerse the thermocouple in the molten metal. Such practice often results in a very short life of the thermocouple. To extend its life various metallic or non-metallic coatings have been applied thereto to protect it from the molten bath. However, this arrangement is not always satisfactory because a coating which is resistant to molten metal, for example refractory material, may tend to crack due to conditions encountered within the furnace, such as the temperature or movement of the molten metal. Another approach to prolong the life of a thermocouple has been to locate its heat sensing tip in the wall of the molten metal furnace and to extrapolate the temperature of the molten metal therefrom. This alleviates the problem to some extent. However, when the furnace wall in which the thermocouple is embedded is of carbonaceous material, as for example the carbon lining of an electrolytic aluminum production cell, a particularly acute problem arises. Carbon in contact with the encapsulating tube diffuses or migrates through the tube (refractory or metallic) and reacts with the wire forming the thermocouple, thereby adversely affecting its sensitivity and hence shortening its useful life.

OBJECTS

A purpose of the invention is to extend the life of a thermocouple embedded in the carbonaceous wall of a furnace.

Another objective of this invention is to provide a carbon impermeable composite tube for a thermocouple.

These, as well as other objectives, will become apparent in the discussion that follows.

SUMMARY OF THE INVENTION

It is to be observed that the present invention provides a novel assembly for greatly enhancing the life of a thermocouple against attack by furnace carbon in contact therewith. The thermocouple is surrounded by a material which is permeable by carbon, and by a metallic material which is reactive with carbon; the carbon reactive material is intermediate the thermocouple and carbon permeable layer. Accordingly, the life of the thermocouple is determined largely by the available carbon reactive material.

DETAILED DESCRIPTION

The drawing is a schematic elevation, partially in cross-section, of an embodiment of the invention.

Referring to the FIGURE, the present invention contemplates a thermocouple assembly 10 embedded in the wall of a furnace 20 having a carbonaceous layer or liner 30. For clarity purposes a portion of a typical furnace wall 20 is shown having an outer metal wall 45, a layer 35 of insulation, and an inner carbonaceous liner 30 in contact with molten material 25. The thermocouple assembly 10 is embedded in the furnace wall and may be supported in the furnace wall by any known conventional means; however, where the assembly is mounted in the wall of an electrolytic cell, such as an aluminum reduction cell, for example, electrical insulation 40 can be provided at the metal juncture to prevent short circuiting of the cell. The thermocouple of the assembly 10 features a conventional structure having two wires 50 of dissimilar metals or metal alloys separated by insulating means 70 and joined at the heat sensing end 60 and located within the composite tube 80. The thermocouple may be of the metal sheathed type, thereby providing a further (protective) wall within the composite tube.

The tube 80 is composed of at least two layers, an outer layer or jacket 90 and an inner layer 100. The outer jacket 90 consists of a material which may allow carbon to diffuse through it but which is impervious to non-carbonaceous substances in the liner 30, such as furnace gases or liquids which diffuse through the liner. For instance, in the use of the thermocouple assembly in the wall of an aluminum smelting cell or refining cell at normal operating temperatures, an outer jacket 90 of an oxidation resistant metal will be impervious to furnace gases or liquids. However, such metals will allow carbon from the cell wall 30 with which it is in contact to migrate or diffuse through it. Examples of oxidation resistant metals are those metals which include nickel or nickel based alloys containing at least 60 percent nickel and at least 10 percent chromium along with up to 10 percent iron, up to 3 percent manganese, up to 3 percent titanium, up to 6 percent aluminum and up to 6 percent columbium. These alloys are available from the International Nickel Company. Further included in oxidation resistant metals is the austenitic stainless steels known as the 18–8 series and containing 16 to 20 percent chromium and 8 to 15 percent nickel. Stainless steel alloys 446, 309 and 310 are preferred. A further example of metals which may be used for the jacket 90 is mild steel. However, mild steel may have a shorter serviceable life than the above-mentioned metals. However, the resistance of metals such as mild steel may be improved by treating them at elevated temperatures in contact with powdered aluminum to cause a surface portion thereof to be alloyed with aluminum by diffusion. One such process which provides this treatment is known as Alonizing and is available from Alon Processing, Inc. of Tarentum, Pennsylvania. Other material which may serve as an outer jacket is ceramic or ceramic and metallic combination. The chief disadvantage, though, with ceramic material is the tendency to crack and thus allow non-carbonaceous material to pass through.

Because of such carbon diffusion through the outer layer 90, an inner layer or liner 100 of a material which will react with the carbon at the temperatures involved is provided around the thermocouple, intermediate the outer layer 90 and the thermocouple wires 50, thereby preventing carbon which penetrates through the outer layer from reaching the wires 50. Such carbon reactive materials are those having free energies of formation of their carbides generally more negative than 15,000 cal/gram-atom of carbon. These materials include zirconium, titanium, tantalum, niobium, vanadium, chromium and in certain cases alloys thereof. Preferred metals for the inner layer are zirconium and titanium since each has a relatively large negative free energy of formation and therefore combines readily with carbon. For example, in the case of zirconium the free energy of formation of its carbide lies at a value more negative than −15,000 cal/gram-atom, i.e. for an operating temperature about 900°C the free energy of zirconium carbide is in the neighborhood of −80,000 as shown at FIG. 1 (herein incorporated by reference), page 10 of a publication dated August 1971 by K. A. Gschneidner and Nancy Kippenhan entitled Thermochemistry of the Rare-Earths, Carbides, Nitrides and Sulfides for Steelmaking, available from Rare-Earth Information Center, Institute for Atomic Research, Iowa State University, Ames, Iowa 50010. Further, inner layer 100 may be in continuous or particulate form. If the latter is used, it may be compacted intermediate the outer layer and the thermocouple or dispersed in a suitable binder or refractory material.

The outer end of the jacket 90 may be sealed with a layer 120 of insulation, or may be crimped shut, to prevent access of air or corrosive atmosphere to the various components within the jacket.

Thus, the invention envisions a thermocouple assembly in which the thermocouple itself is surrounded and is protected against attack by carbon by a material which reacts with such carbon as diffuses through a protective sheath in which the thermocouple is encased. What is meant by surrounded in this instance is that the portion of the thermocouple in the furnace wall is substantially enclosed within the sheath to afford protection against carbon that migrates from any direction within the wall. Depending on the environment, an outer layer is employed which will screen out certain substances which would attack the thermocouple yet permit permeation of the outer layer by carbon.

The present thermocouple arrangement has been used to measure temperatures in various arrangements and systems including furnaces having at least one layer of carbon in the walls thereof. It has repeatedly withstood attack by hot carbon. For example, when a thermocouple encapsulated in a tube composed of an outer layer of stainless steel and an inner layer of titanium, and a thermocouple enclosed only in a stainless steel tube, were placed in the wall of an aluminum electrolytic cell, the thermocouple in the stainless steel tube only had a useful life of 7 days while the thermocouple encapsulated in the novel stainless steel-titanium sheath lasted for 125 days. Thus, the life of the thermocouple was extended at least 17 fold.

While the present improvement has been described with particular reference to furnaces for producing metals, it is to be understood that the new improved thermocouple assembly would have excellent application in measuring elevated temperatures in other carbonaceous materials such as, for example, molded carbon bodies being baked in the so-called "ring" furnaces or tunnel kilns.

In view of our invention and disclosure, variations and modifications will doubtless become evident to others skilled in the art. We claim all embodiments thereof insofar as they fall within the reasonable spirit and scope of the appended claims.

We claim:

1. A thermocouple assembly comprising a thermocouple, the said thermocouple being surrounded by a first material through which carbon in contact therewith can diffuse, and by a metallic meterial which is reactive with carbon and in contact with first material the said carbon reactive material being intermediate the thermocouple and the material through which carbon can diffuse.

2. A thermocouple assembly in accordance with claim 1 wherein the carbon reactive material has a free energy of formation of the carbide more negative than −15,000 cal/gram-atom of carbon.

3. A thermocouple assembly in accordance with claim 1 in which the said carbon reactive material is a material selected from the group consisting of titanium, zirconium and hafnium.

4. A thermocouple assembly according to claim 1 in which the material through which carbon can diffuse is metal.

5. A thermocouple assembly according to claim 1 in which the material through which carbon can diffuse is an oxidation resistant metal.

6. A thermocouple assembly comprising a thermocouple enclosed in a tube, said tube comprising an outer layer of material through which carbon in contact therewith can diffuse, and an inner layer of metallic material reactive with carbon, said inner layer in contact with said outer layer.

7. A thermocouple assembly according to claim 6 wherein the said carbon reactive material is selected from the group consisting of titanium, zirconium and hafnium.

8. A thermocouple assembly comprising a thermocouple, said thermocouple being surrounded by metal, and by titanium, said titanium being intermediate the metal and the thermocouple.

9. A thermocouple assembly comprising a thermocouple enclosed in a tube, said tube having an outer layer of oxidation resistant metal and an inner layer of a material selected from the group consisting of titanium, zirconium and hafnium.

10. A thermocouple assembly according to claim 9 wherein the metal is an oxidation resistant metal.

11. In a furnace having at least one carbonaceous layer in the walls thereof, and a thermocouple assembly in contact with said carbonaceous layer to measure the temperature therein, said thermocouple assembly comprising a thermocouple encapsulated in a tube, said tube comprising an outer layer of stainless steel and an inner layer of a carbon reactive material selected from the group consisting of zirconium, titanium and hafnium.

\* \* \* \* \*

UNITED STATES PATENT AND TRADEMARK OFFICE
CERTIFICATE OF CORRECTION

PATENT NO. : 3,975,212
DATED : August 17, 1976
INVENTOR(S) : Warren E. Haupin and John W. Luffy It is certified that error appears in the above-identified patent and that said Letters Patent are hereby corrected as shown below:

Column 4, line 7      Change "meterial" to --material--.

Column 4, line 8      After "with" (second occurrence) insert --said--.

Column 4, line 45      After "claim" change "9" to --8--.

Signed and Sealed this

Nineteenth Day of October 1976

[SEAL]

Attest:

RUTH C. MASON
Attesting Officer

C. MARSHALL DANN
Commissioner of Patents and Trademarks